United States Patent
Jang et al.

(10) Patent No.: US 10,560,193 B2
(45) Date of Patent: Feb. 11, 2020

(54) DSM-PSK OPTICAL WIRELESS TRANSMISSION METHOD AND DEVICE

(71) Applicant: KOOKMIN UNIVERSITY INDUSTRY ACADEMY COOPERATION FOUNDATION, Seoul (KR)

(72) Inventors: Yeong Min Jang, Seoul (KR); Van Trang Nguyen, Seoul (KR); Chang Hyun Hong, Goyang-si (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/069,844

(22) PCT Filed: Nov. 28, 2016

(86) PCT No.: PCT/KR2016/013778
§ 371 (c)(1),
(2) Date: Jul. 12, 2018

(87) PCT Pub. No.: WO2017/122925
PCT Pub. Date: Jul. 20, 2017

(65) Prior Publication Data
US 2019/0326997 A1    Oct. 24, 2019

(30) Foreign Application Priority Data

Jan. 12, 2016 (KR) ............... 10-2016-0003871
Jan. 15, 2016 (WO) ............ PCT/KR2016/000482

(Continued)

(51) Int. Cl.
*H04B 10/116* (2013.01)
*H04B 10/556* (2013.01)
*H04B 10/69* (2013.01)

(52) U.S. Cl.
CPC ....... *H04B 10/5561* (2013.01); *H04B 10/116* (2013.01)

(58) Field of Classification Search
CPC ... H04B 10/116; H04B 10/5561; H04B 10/69
See application file for complete search history.

(56) References Cited

U.S. PATENT DOCUMENTS

2006/0193403 A1    8/2006  Ali
2013/0126713 A1*   5/2013  Haas ............... H04B 10/116
                                                    250/208.2

(Continued)

FOREIGN PATENT DOCUMENTS

JP    11-112426 A      4/1999
JP    2009-284128 A    12/2009

(Continued)

OTHER PUBLICATIONS

Y. Jang et al., "Kookmin University PHY sub-proposal for ISC using Dimmable Spatial M-PSK (DSM-PSK)", Jan. 2016.*

(Continued)

*Primary Examiner* — Shi K Li
(74) *Attorney, Agent, or Firm* — Novick, Kim & Lee, PLLC; Sang Ho Lee

(57) ABSTRACT

A DSM-PSK optical wireless transmission method includes the steps of: receiving a binary data signal, allowing a modulator to convert the binary data signal into a global phase shift signal, generating a reference signal group including M number of pulse signals having the same period, the same duty ratio of d/M, mutually different phases, and a determined sequence, generating a data signal (Continued)

group including M number of pulse signals having a determined sequence, the pulse signals having been obtained by phase-shifting the reference signal group according to the global phase shift signal, flickering each light source of a reference light source group including M number of light sources having a determined sequence, according to each pulse signal of the reference signal group, and flickering each light source of a data light source group including M number of light sources having a determined sequence, according to each pulse signal of the data signal group.

18 Claims, 10 Drawing Sheets

(30) Foreign Application Priority Data

Jul. 25, 2016 (KR) .......................... 10-2016-0094446
Oct. 27, 2016 (KR) .......................... 10-2016-0141383

(56) References Cited

U.S. PATENT DOCUMENTS

2013/0251374 A1    9/2013  Chen et al.
2018/0159624 A1*   6/2018  Jang ..................... H04B 10/116

FOREIGN PATENT DOCUMENTS

KR      10-1472583 B1    12/2014
WO      2015/059852 A1    4/2015

OTHER PUBLICATIONS

S. Lee et al., "Multilevel Transmission in Dimmable Visible Light Communication Systems", Journal of Lightwave Technology, vol. 31, No. 20, Oct. 2013.*

Jang, Yeong Min et al., "Kookmin University PHY Sub-proposal for ISC Using Dimmable Spatial M-PSK (DSM-PSK)", doc.: IEEE 802.15-16-0015-00-007a, Jan. 10, 2016 (https://mentor.ieee.org/802.15/documents?n=686s.group=007a).

* cited by examiner

DSM-PSK OPTICAL WIRELESS TRANSMISSION METHOD AND DEVICE

TECHNICAL FIELD

The present invention relates to a DSM-PSK optical wireless communication method and an apparatus thereof.

BACKGROUND ART

Recently, as the Visible Light Communication (VLC) technique, which enables wireless communication by adding communication functions to a visible light wavelength using an infrastructure in which lighting of incandescent bulbs or fluorescent tubes is replaced by Light Emitting Diode (LED) lighting, is actively studied and IEEE 802.15.7 international standard specification is completed, development of business models for commercialization is in progress. However, since IEEE 802.15.7 is generally limited to data transmission using a photo diode (PD), it has a problem in that a dedicated communication apparatus such as a VLC dongle or the like should be used. Accordingly, international standardization of Optical Wireless Communications (OWC), which mainly uses an image sensor such as a camera of a smart phone rather than a photo diode and includes infrared and ultraviolet wavelengths, as well as visible light, is progressed in IEEE 802.15.7r1 OWC TG (Task Group).

The inventor of the present invention is the chairman of IEEE 802.15.7r1 OWC TG of International Standard Organization, leading OWC international standardization by presenting many contributions related to OWC techniques, and the present invention relates to the Dimmable Spatial M-Phase Shift Keying (DSM-PSK) modulation method, which is one of most essential techniques of OWC international standard techniques.

DISCLOSURE OF INVENTION

Technical Problem

The present invention provides an optical wireless communication method using LEDs and an image sensor and an apparatus thereof.

Technical Solution

A DSM-PSK optical wireless transmitting method according to an embodiment of the present invention includes: receiving, by a modulator, an input of a binary data signal; converting, by the modulator, the binary data signal into a global phase shift signal having an integer value from 0 to M−1, wherein M is an integer equal to or greater than 3; creating, by the modulator, a reference signal group including M ordered pulse wave signals having the same cycle, the same duty ratio of d/M and different phases, wherein d is an integer from 1 to M−1, the phase is $p*2\pi/M$, and p is an integer from 0 to M−1; creating, by the modulator, a data signal group including M ordered pulse wave signals by phase-shifting the reference signal group according to the global phase shift signal; turning on and off, by a transmitter, each of light sources of the reference light source group including M ordered light sources, according to each pulse wave signal of the reference signal group; and turning on and off, by the transmitter, each of light sources of the data light source group including M ordered light sources, according to each pulse wave signal of the data signal group.

In an embodiment, converting the binary data signal into a global phase shift signal includes converting the binary data signal into the global phase shift signal having an integer value from 0 to (M−1)=($2^k$−1) by dividing the binary data signal in groups of k bits.

In an embodiment, k is 3, and converting the binary data signal is based on Table 8.

A DSM-PSK optical wireless receiving method according to an embodiment of the present invention includes: receiving, by a receiver, consecutively photographed images from an image sensor; detecting, by a demodulator, ON/OFF states of a reference light source group including M ordered light sources and a data light source group including M ordered light sources on the images; converting, by the demodulator, the ON/OFF state of the reference light source group into a reference spatial phase according to a predetermined rule, wherein the reference spatial phase is an integer from 1 to M; converting, by the demodulator, the ON/OFF state of the data light source group into a data spatial phase according to the predetermined rule, wherein the data spatial phase is an integer from 1 to M; obtaining, by the demodulator, a spatial phase shift from a difference between the data spatial phase and the reference spatial phase, wherein the spatial phase shift is an integer from 0 to M−1; and converting, by the demodulator, the spatial phase shift into a binary data.

In an embodiment, the M light sources of the reference light source group are turned on and off according to a reference signal group including M ordered pulse wave signals having the same cycle, the same duty ratio of d/M and different phases, wherein d is an integer from 1 to M−1, the phase is $p*2\pi/M$, and p is an integer from 0 to M−1, and the M light sources of the data light source group are turned on and off according to a data signal group created by phase-shifting the reference signal group as much as a predetermined value.

In an embodiment, the ON/OFF states of the M light sources of the reference light source group and the ON/OFF states of the M light sources of the data light source group are expressed as a binary digit of M bits, respectively, and the binary digit of M bits has a value corresponding to a cycle of a binary data having a cycle of M and a duty ratio of d/M, wherein d is an integer from 1 to M−1, and the predetermined rule determines a phase of the binary digit as a spatial phase.

In an embodiment, M is 8, and the predetermined rule is based on Table 7.

In an embodiment, M is 8, and the predetermined rule is based on Table 10.

In an embodiment, the spatial phase shift has an integer value from 0 to $2^k$−1, and converting the spatial phase shift into a binary data includes converting the spatial phase shift into a binary data of k bits.

In an embodiment, k is 3, and converting the binary data signal is based on Table 9.

A hybrid DSM-PSK optical wireless transmitting method according to an embodiment of the present invention includes: receiving, by a modulator, an input of a first data signal; generating, by the modulator, a dimming signal of a first frequency using a predetermined modulation method according to the first data signal; and changing, by a DSM-PSK optical wireless transmitting device, brightness of one or more light source panels using the first frequency according to the dimming signal, wherein changing brightness of the one or more light source panels using the first frequency includes: receiving an input of a second data signal; and changing brightness of the one or more light source panels by adjusting value d using the first frequency according to the dimming signal, while turning on and off light sources of the one or more light source panels at a second frequency using the DSM-PSK optical wireless transmitting method of any one of claims 1 to 3 using the second data signal as an input.

In an embodiment, the second frequency is higher than the first frequency.

In an embodiment, generating a dimming signal using a predetermined modulation method includes generating a first dimming signal and a second dimming signal using an S2-PSK method, and changing brightness of one or more light source panels using the first frequency includes changing brightness of a first light source panel according to the first dimming signal and changing brightness of a second light source panel according to the second dimming signal.

In an embodiment, turning on and off light sources of the one or more light source panels at a second frequency includes turning on and off light sources of the first and second light source panels at the second frequency using a DS8-PSK method.

A hybrid DSM-PSK optical wireless transmitting method according to an embodiment of the present invention includes: generating, by a first modulator, a first dimming signal of a first frequency periodically repeating binary value 0s and 1s; receiving, by the first modulator, an input of a first binary data signal; outputting, by the first modulator, a second dimming signal, which is a binary data signal, having a frequency the same as that of the first dimming signal, a phase the same as that of the first dimming signal when the first binary data signal is a binary value 0, and a phase opposite to that of the first dimming signal when the first binary data signal is a binary value 1; changing, by a DSM-PSK optical wireless transmitting device, brightness of a first light source panel according to the first dimming signal; and changing, by the DSM-PSK optical wireless transmitting device, brightness of a second light source panel according to the second dimming signal, wherein each of changing brightness of a first light source panel and changing brightness of a second light source panel includes: receiving, by a second modulator, an input of the first or second dimming signal; generating, by the second modulator, a signal d having a value d0 when the inputted dimming signal is a binary value 0 and having a value d1 when the inputted dimming signal is a binary value 1, wherein d0 and d1 are different integers from 1 to M−1, and M is an integer equal to or greater than 3; receiving, by the second modulator, an input of a second binary data signal; converting, by the second modulator, the second binary data signal into a global phase shift signal having an integer value from 0 to M−1; creating, by the second modulator, a reference signal group including M ordered pulse wave signals having the same frequency of the second frequency, the same duty ratio of d/M and different phases, wherein the phase is $p*2\pi/M$, and p is an integer from 0 to M−1; creating, by the second modulator, a data signal group including M ordered pulse wave signals by phase-shifting the reference signal group according to the global phase shift signal; turning on and off, by a transmitter, each of light sources of the reference light source group including M ordered light sources in a light source panel corresponding to the inputted dimming signal, according to each pulse wave signal of the reference signal group; and turning on and off, by the transmitter, each of light sources of the data light source group including M ordered light sources in a light source panel corresponding to the inputted dimming signal, according to each pulse wave signal of the data signal group.

In an embodiment, the second frequency is higher than the first frequency.

In an embodiment, the hybrid DSM-PSK optical wireless transmitting method further includes receiving, by the DSM-PSK optical wireless transmitting device, an input of illuminance of a light source panel, and determining d0 and d1 so that (d0+d1)/2M becomes the inputted illuminance of a light source panel.

A hybrid DSM-PSK optical wireless receiving method according to an embodiment of the present invention includes: receiving, by a first receiver, first images consecutively photographed at a first frame rate from a first image sensor; detecting, by a first demodulator, change of brightness of one or more light source panels on the first images; demodulating, by the first demodulator, a first binary data using a predetermined demodulation method according to the change of brightness of the one or more light source panels; receiving, by a second receiver, second images consecutively photographed at a second frame rate from a second image sensor; and demodulating, by a second demodulator, a second binary data using a DSM-PSK optical wireless receiving method according to the above DSM-PSK optical wireless transmitting method for the light sources in the one or more light source panels on the second images.

In an embodiment, the second frame rate is higher than the first frame rate.

In an embodiment, detecting change of brightness of one or more light source panels on the first images includes detecting change of brightness of two light source panels on the first images, and demodulating a first binary data includes demodulating the first binary data using an S2_PSK method according to the change of brightness of the two light source panels.

In an embodiment, demodulating a second binary data includes demodulating the second binary data using a DS8-PSK method.

In an embodiment, detecting change of brightness of one or more light source panels on the first images includes determining an average of brightness of light sources in each light source panel as brightness of the light source panel.

In an embodiment, the hybrid DSM-PSK optical wireless receiving method includes determining an RoI of the second image sensor using position information of the one or more light source panels detected on the first images.

In an embodiment, the first image sensor is an image sensor of a rolling shutter method, and the second image sensor is an image sensor of a global shutter method.

A hybrid DSM-PSK optical wireless receiving method according to an embodiment of the present invention includes: receiving, by a first receiver, first images consecutively photographed at a first frame rate from a first image sensor; outputting, by a first demodulator, a first binary data having a binary value 0 when a phase of change of brightness of a first light source panel on the first images is the same as a phase of change of brightness of a second light source panel on the first images and having a binary value 1 when the phase of change of brightness of the first light source panel is opposite to the phase of change of brightness of the second light source panel; receiving, by a second receiver, second images consecutively photographed at a second frame rate from a second image sensor; and demodulating, by a second demodulator, a second binary data using a DSM-PSK optical wireless receiving method for light sources of the first light source panel or the second light source panel on the second images, wherein demodulating a second binary data includes: detecting ON/OFF states of a reference light source group including M ordered light sources and a data light source group including M ordered light sources in the first light source panel or the second light source panel on the second images; converting the ON/OFF state of the reference light source group into a reference spatial phase according to a predetermined rule, wherein the reference spatial phase is an integer from 0 to M−1; converting the ON/OFF state of the data light source group into a data spatial phase according to the predetermined rule, wherein the data spatial phase is an integer from 0 to M−1; obtaining a spatial phase shift from a difference between the data spatial phase and the reference spatial phase, wherein the spatial phase shift is an integer from 0 to M−1; and converting the spatial phase shift into the second binary data.

In an embodiment, the second frame rate is higher than the first frame rate.

A DSM-PSK optical wireless transmitting device according to an embodiment of the present invention includes: a modulator and a transmitter, wherein the modulator receives an input of a binary data signal, converts the binary data signal into a global phase shift signal having an integer value from 0 to M−1, wherein M is an integer equal to or greater than 3, creates a reference signal group including M ordered pulse wave signals having the same cycle, the same duty ratio of d/M and different phases, wherein d is an integer from 1 to M−1, the phase is p*2π/M, and p is an integer from 0 to M−1, and creates a data signal group including M ordered pulse wave signals by phase-shifting the reference signal group according to the global phase shift signal, and the transmitter turns on and off each of light sources of the reference light source group including M ordered light sources, according to each pulse wave signal of the reference signal group, and turns on and off each of light sources of the data light source group including M ordered light sources, according to each pulse wave signal of the data signal group.

A DSM-PSK optical wireless receiving device according to an embodiment of the present invention includes: a receiver and a demodulator, wherein the receiver receives consecutively photographed images from an image sensor, and the demodulator detects ON/OFF states of a reference light source group including M ordered light sources and a data light source group including M ordered light sources on the images; converts the ON/OFF state of the reference light source group into a reference spatial phase according to a predetermined rule, wherein the reference spatial phase is an integer from 1 to M; converts the ON/OFF state of the data light source group into a data spatial phase according to the predetermined rule, wherein the data spatial phase is an integer from 1 to M; obtains a spatial phase shift from a difference between the data spatial phase and the reference spatial phase, wherein the spatial phase shift is an integer from 0 to M−1, and converts the spatial phase shift into a binary data.

A hybrid DSM-PSK optical wireless transmitting device according to an embodiment of the present invention includes: a modulator and a DSM-PSK optical wireless transmitting device, wherein the modulator receives an input of a first data signal, and generates a dimming signal of a first frequency using a predetermined modulation method according to the first data signal; and the DSM-PSK optical wireless transmitting device receives an input of a second data signal, and changes brightness of one or more light source panels by adjusting value d using the first frequency according to the dimming signal, while turning on and off light sources of the one or more light source panels at a second frequency using the DSM-PSK optical wireless transmitting method of any one of claims 1 to 3 using the second data signal as an input.

A hybrid DSM-PSK optical wireless receiving device according to an embodiment of the present invention includes: a first receiver, a first demodulator, a second receiver and a second demodulator, wherein the first receiver receives first images consecutively photographed at a first frame rate from a first image sensor; the first demodulator detects change of brightness of one or more light source panels on the first images, and demodulates a first binary data using a predetermined demodulation method according to the change of brightness of the one or more light source panels; the second receiver receives second images consecutively photographed at a second frame rate from a second image sensor; and the second demodulator demodulates a second binary data using a DSM-PSK optical wireless receiving method according to the above DSM-PSK optical wireless transmitting method for the light sources in the one or more light source panels on the second images.

The present invention includes a program stored in a medium to execute a method according to an embodiment of the present invention in a computer.

The present invention includes a computer-readable recording medium recording a program for executing a method according to an embodiment of the present invention in a computer.

Advantageous Effects

According to the present invention, wireless communication can be performed using an LED and an image sensor, and particularly, communications between vehicles using taillights of the vehicles, smart phones and the like can be efficiently performed.

BEST MODE FOR CARRYING OUT THE INVENTION

Figure 1:
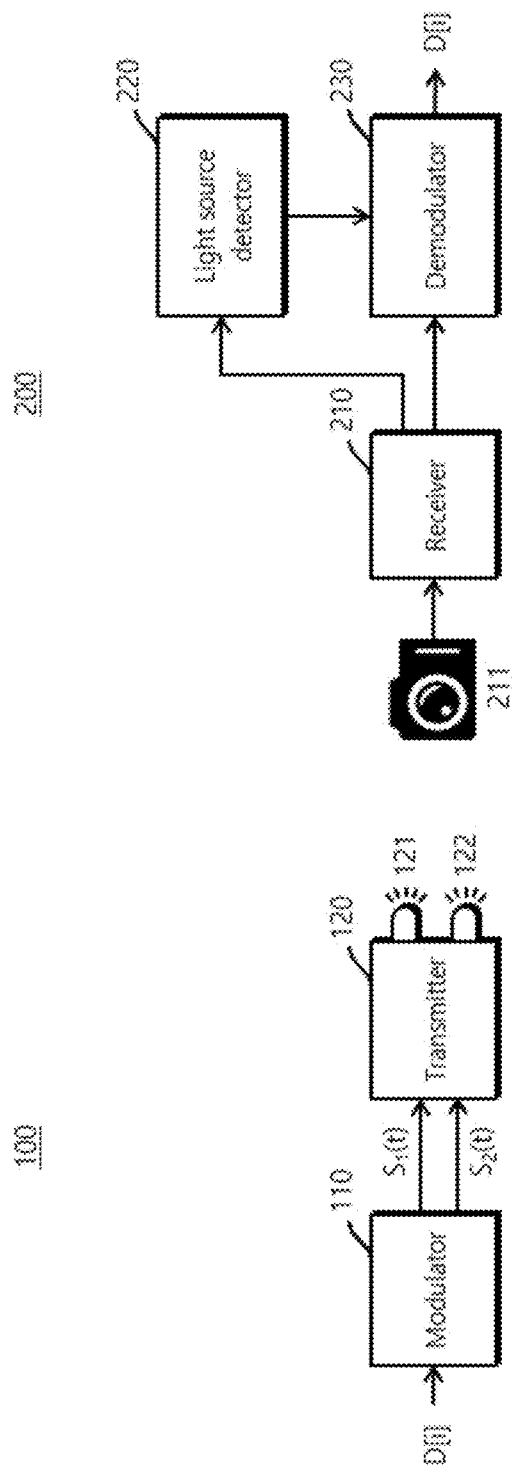
FIG. 1 is a view schematically showing the configuration of an S2-PSK optical wireless communication system according to an embodiment of the present invention.

Hereinafter, preferred embodiments of the present invention will be described in detail with reference to the accompanying drawings to clarify the spirit of the present invention. In describing the present invention, when it is determined that specific description of already known functions or constitutional components related to the present invention may make the gist of the present invention unclear, detailed description thereof will be omitted. Whenever possible, the same reference numerals and symbols are assigned to the constitutional components practically having the same functional configuration in the drawings although they are shown in different drawings. For the convenience of explanation, apparatuses and methods are described together in case of necessity.

First, after describing a Spatial 2-Phase Shift Keying (S2-PSK) method and a DSM-PSK method, a Hybrid DSM-PSK method using these two methods together will be described.

S2-PSK

FIG. 1 is a view schematically showing the configuration of an S2-PSK optical wireless communication system according to an embodiment of the present invention. Referring to FIG. 1, an S2-PSK optical wireless communication system according to an embodiment of the present invention includes an S2-PSK optical wireless transmitting device 100 and an S2-PSK optical wireless receiving device 200. The S2-PSK optical wireless transmitting device 100 includes a modulator 110 and a transmitter 120, and the S2-PSK optical wireless receiving device 200 includes a receiver 210 and a demodulator 230 and may additionally include a light source detector 220. The modulator 110 receives an input of a binary data signal D[i], which is a bit sequence to be transmitted, and generates binary data signals $S_1(t)$ and $S_2(t)$ having a modulated pulse waveform. Here, $S_1$ and $S_2$ may be continuous signals or discrete signals, and hereinafter, it will be described assuming that they are continuous signals.

The transmitter transmits data by turning on and off a first light source 121 and a second light source 122 according to the binary data signals $S_1(t)$ and $S_2(t)$. Here, turning on and off does not necessarily mean a method of completely turning on and off a light source, but includes all methods of expressing two states of 0 and 1 using change of brightness of the light source. If a frequency of turning on and off a light source is higher than a predetermined value (e.g., 200 Hz), a human being does not feel ON/OFF of the light source. The receiver 210 receives an image sequence of light sources continuously photographed (sampled) by an image sensor 211. The light source detector 220 detects positions of light sources from a received image. The demodulator 230 demodulates data signals from the ON/OFF states of the light sources.

In the present invention, the transmitter 120 transmits data using two or more light sources, and a case of using two light source will be described hereinafter for the convenience of explanation. Using a plurality of light source like this is to efficiently perform optical wireless communication by spatially separating data signals and reference signals.

Describing more specifically, in implementing the optical wireless communication, the main considerations are as described below. First, it should be considered whether or not the optical wireless communication may support both a global shutter method and a rolling shutter method. That is, a communication method that can be used for both a camera of a global shutter method and a camera of a rolling shutter method is preferable. Second, change of frame rate should be considered. In an apparatus operating on the basis of a general OS, the frame rate of an image sensor is not constant and varies according to the state of using resources by the OS. For example, in the case of a camera of a smart phone, the frame rate varies approximately between 20 fps and 30 fps. Accordingly, it is preferable that an optical wireless communication method supports such a variable frame rate. Third, the optical wireless communication has many use cases of travelling transmitters or receivers, and particularly in the case of communication between vehicles, since a transmitting and receiving apparatus moves at a high speed of 10 m/s or faster, it is highly probable that a noise environment greatly varies in the images continuously photographed by an image sensor. Accordingly, it is preferable that the optical wireless communication method is capable of dealing with abrupt change of noises.

Figures 2, 3:
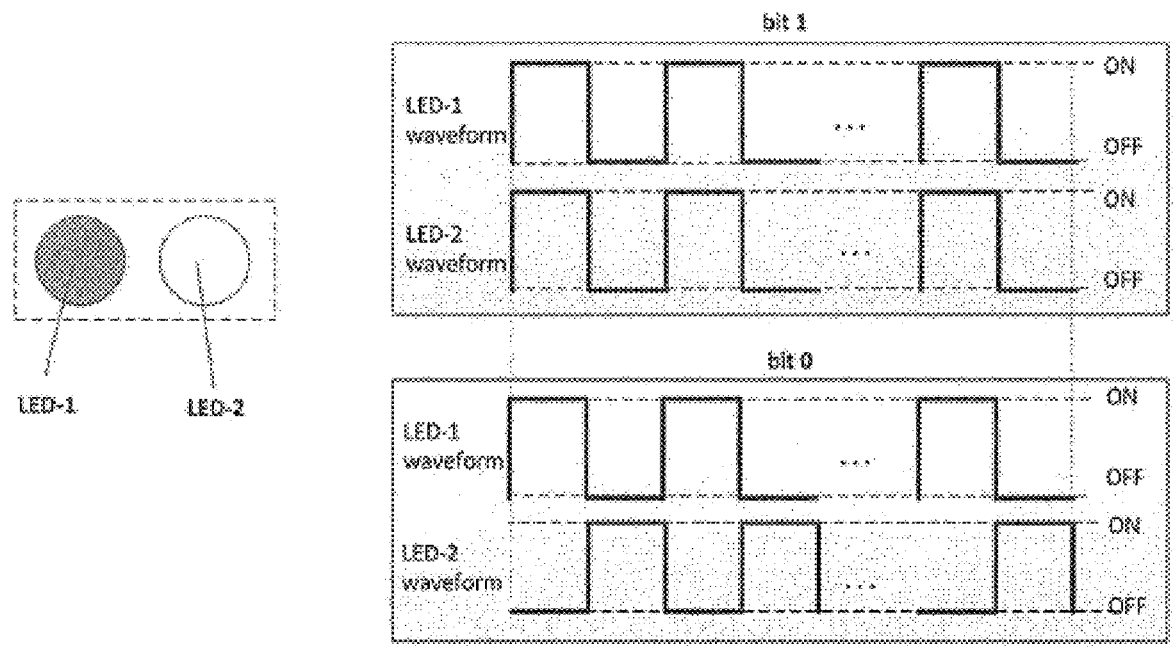
FIG. 2 is a view showing a modulation method of an S2-PSK optical wireless communication system according to an embodiment of the present invention.
FIG. 3 is a view showing a demodulation method of an S2-PSK optical wireless communication system according to an embodiment of the present invention.

FIG. 2 is a view showing the modulation method of an S2-PSK optical wireless communication system according to an embodiment of the present invention. Referring to FIG. 2, among the two light sources turned on and off according to the signals $S_1(t)$ and $S_2(t)$ generated by the modulator 110, the first light source 121 is a reference light source, and the second light source 122 is a data light source. The data light source is a light source turned on and off by a data signal on which a data to be actually transmitted is loaded, and the reference light source is a light source turned on and off according to a reference signal periodically repeating binary value 0s and 1s.

The reference signal $S_1(t)$ which turns on and off the reference light source is a pulse train signal periodically repeating binary value 0s and 1s, and its waveform may be expressed as Equation 1. In the equation, T denotes the pulse cycle of the reference signal, N pulses are included in a bit interval, and k is a natural number from 1 to N.

$$S_1(t) = \begin{cases} 1, & (k-1)T \le t < \left(k - \frac{1}{2}\right)T \\ 0, & \left(k - \frac{1}{2}\right)T \le t < kT \end{cases} \quad \text{[Equation 1]}$$

Meanwhile, the data signal $S_2(t)$ which turns on and off the data light source is a pulse train signal having a frequency the same as that of the reference signal $S_1(t)$, and if a data to be transmitted, i.e., an input data signal D[i], is 0, the data signal has a phase the same as that of the reference signal $S_1(t)$, and if the input data signal D[i] is 1, the data signal has a phase opposite to the phase of the reference signal $S_1(t)$.

FIG. 3 is a view showing the demodulation method of an S2-PSK optical wireless communication system according to an embodiment of the present invention. Referring to FIG. 3, the demodulator 230 compares ON/OFF states, i.e., phases, of the first light source and the second light source in a sampled image. At this point, the demodulator 230 may use positions of the first light source and the second light source detected by the light source detector 220. The demodulator 230 outputs a binary value 0 if the phases of the two light sources are the same and outputs a binary value 1 if the phases of the two light sources are opposite. That is, the demodulator 230 performs demodulation by an XOR operation on the ON/OFF states of the two light sources as shown in Equation 2. In the equation, $S_1(k)$ and $S_2(k)$ are respectively an ON/OFF state of each light source in the k-th image.

$$\text{bit}=XOR\{S_1(k);S_2(k)\} \quad \text{[Equation 2]}$$

In a simple word, the demodulator 230 outputs a binary value 0 if both of the two light sources are turned on or turned off in a sampled image and outputs a binary value 1 if one of the two light sources is turned on. Accordingly, the S2-PSK optical wireless receiving device 200 does not need to know which one is a reference light source and which one is a data light source among the two light sources for the purpose of demodulation. In addition, since two light sources photographed in one image are compared, it is not affected although there is a change in the frame rate of the image sensor. However, the frame rate should be higher than the frequency of the data clock.

It is described above that if the input data signal is 0, data signal $S_2(t)$ has a phase the same as that of reference signal $S_1(t)$, and if the input data signal is 1, data signal $S_2(t)$ has a phase opposite to the phase of reference signal $S_1(t)$. However, an opposite case may also be considered. That is, the modulator 110 may perform modulation in such a manner that data signal $S_2(t)$ has a phase the same as that of the reference signal $S_1(t)$ if the input data signal is 1 and has a phase opposite to the phase of the reference signal $S_1(t)$ if the input data signal is 0. In this case, the demodulator 230 performs demodulation by an NXOR operation, instead of XOR operation, in Equation 2. Hereinafter, the former is referred to as a first modulation method, and the latter is referred to as a second modulation method, and it will be described on the basis of the first modulation method unless otherwise mentioned. The first modulation method and the second modulation method are only a problem of selecting a phase with respect to a data value, they correspond to practically the same technical spirit.

Figure 4:
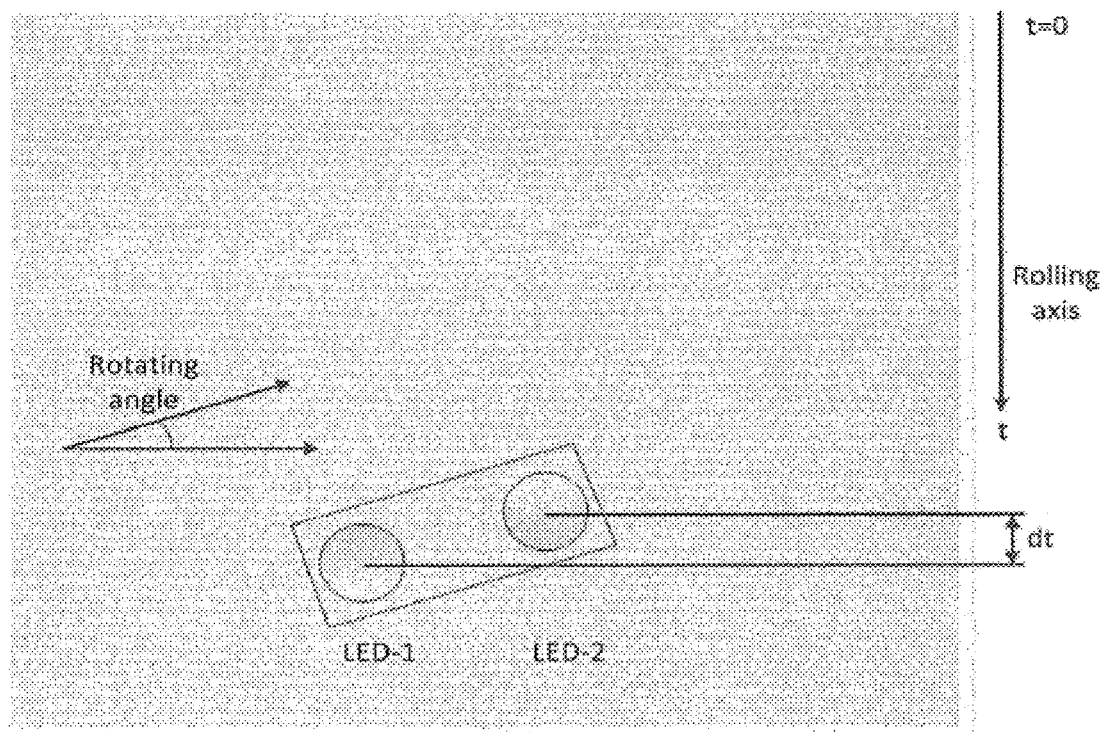
FIG. 4 is a view showing a phenomenon appearing when a plurality of light sources is photographed in a rolling shutter method.

FIG. 4 is a view showing a phenomenon appearing when a plurality of light sources is photographed in a rolling shutter method. Since a time of sampling an image by an image sensor of a rolling shutter method varies row by row, two light sources are sampled simultaneously if they are arranged side by side along the row. Otherwise, there may be a time difference in sampling the two light sources. The sampling time difference dt of the two light sources may be expressed as shown in Equation 3. In the equation, $N_{pixel}$ denotes the number of pixels of the difference between the rows of the two light sources, and $F_s$ denotes the sampling rate of an image sensor for sampling a row. For example, the sampling rate of a Nexus 5× camera is expressed as $F_s$=34.53 kHz.

$$dt = N_{pixel} \times \frac{1}{F_s} \quad \text{[Equation 3]}$$

Since there may be a sampling time difference between the two light sources according to the rotation state or distance of the light sources and the image sensor, this leads to variation of phase difference in ON/OFF of the two light sources, and an errors occurs in the demodulation eventually. That is, although the first light source and the second light source are turned on and off at the same phase as the transmission data is 0, it looks as if a light source is turned on and the other light source is turned off in a sampled image, and the demodulated data may be 1, and although the first light source and the second light source are turned on and off at the opposite phases as the transmission data is 1, it looks as if both of the light sources are turned on or off in a sampled image, and the demodulated data may be 0. In an embodiment of the present invention, additional line coding is used to reduce such an error.

According to an embodiment of the present invention, the S2-PSK optical wireless transmitting device 100 may include a line encoder in front of the modulator 110. The line encoder encodes a binary data signal D[j] at a code rate of 1/2 and outputs a line code according to Table 1, and the modulator 110 receives an input of the line code outputted from the line encoder and generates binary data signals $S_1(t)$ and $S_2(t)$ in a method the same as described above.

TABLE 1

| Input bit | Output code |
| --- | --- |
| 0 | 00 |
| 1 | 01 |

In this case, the S2-PSK optical wireless receiving device 200 includes a line decoder behind the demodulator 230, and the line decoder receives a demodulated binary data signal from the demodulator 230 and decodes the demodulated binary data signal according to Equation 4. In the equation, XOR(k) is an output signal of the demodulator 230 and means a binary value demodulated in the k-th image.

$$\text{bit}=XOR\{XOR(k);XOR(k+1)\}=XOR[XOR\{s_1(k);s_2(k)\};XOR\{s_1(k+1);s_2(k+1)\}] \quad \text{[Equation 4]}$$

If line coding like this is used, since a decoded data is determined according to a relative relation between the ON/OFF state of a light source in an image and the ON/OFF state of a light source in a next image, the same result is obtained regardless of an absolute ON/OFF state of a light source. That is, although the ON/OFF phases of the first light source and the second light source of a sampled image are changed to be opposite to the normal phases due to the sampling time difference caused by the rolling shutter effect, in other words, although the two light sources are turned on and off oppositely even though the transmission data is 0 or the two light sources are turned on and off in the same way even though the transmission data is 1, demodulation is normally performed. Accordingly, if line coding like this is used, the S2-PSK optical wireless receiving device 200 does not need to know whether the modulation method of the S2-PSK optical wireless transmitting device 100 is the first modulation method or the second modulation method.

However, demodulation is normally performed only when consecutive two images used by the line decoder for decoding equally have a rolling shutter error, and the error still occurs if only one of the two images has a rolling shutter error. That is, according to the present invention, the error does not occur if the rotation states of the light source and the image sensor are not changed, and the error may occur if the rotation states are changed.

Table 2 and Table 3 are tables showing the effects of line coding. Table 2 shows an effect occurred by the rolling shutter effect when line coding is not applied, and Table 3 shows an effect occurred by the rolling shutter effect when line coding is applied. The underlined parts in the tables show the cases of generating a demodulation error when the phase is changed by the rolling shutter effect.

TABLE 2

| Transmission data | Output of demodulator |
|---|---|
| 010 | 00<u>1</u> |
| 010 | 00<u>1</u> |

As shown in Table 2, if line coding is not applied, an error occurs in a modulated signal as is in case of being affected by the rolling shutter effect.

TABLE 3

| Transmission data | Line code | Output of demodulator | Output of line decoder |
|---|---|---|---|
| 010 | 00 01 00 | 00 01 <u>11</u> | 010 |
| 010 | 00 01 00 | 00 0<u>0 11</u> | 0<u>0</u>0 |
| 010 | 00 01 00 | 00 <u>10 11</u> | 010 |

Contrarily, observing Table 3, it is known that if line coding is applied, an error occurs in a decoded signal only when one of two images used by the line decoder for decoding is affected by the rolling shutter affect.

Meanwhile, although the line decoder wrongly groups consecutive two image pairs configuring a line code, there is nothing wrong with decoding. That is, the line decoder should decode in a way of grouping a k-th image and a k+1-th image as a code and grouping a k+2-th image and a k+3-th image as another code. However, although the line decoder decodes in a way of grouping a k−1-th image and a k-th image as a code and grouping a k+1-th image and a k+2-th image as another code, decoding is normally performed. It is since that the line decoder according to the present invention performs decoding by XORing ON/OFF states of consecutive two images. That is, since 0 is outputted when ON/OFF states of the consecutive two images are not changed and 1 is outputted each time a change occurs, although the decoding is performed by shifting images by one image forward or backward, the result will not be changed. This effect is shown in Table 4.

TABLE 4

| Transmission data | Line code | Output of demodulator | Output of line decoder |
|---|---|---|---|
| 0100 | 00 01 00 00 | 0 00 <u>11</u> 11 1 | 0<u>1</u>0 |
| 0100 | 00 01 00 00 | 0 00 <u>01</u> 11 1 | 0<u>0</u>0 |
| 0100 | 00 01 00 00 | 0 0<u>1</u> 01 11 1 | 0<u>1</u>0 |

As shown in Table 4, although image pairs are wrongly grouped and decoded since the line decoder is not synchronized with the line encoder, an error occurs only when only one of the two images is affected by the rolling shutter effect, and the error does not occur if both of the two images are affected by the rolling shutter effect.

A case of performing line coding on the basis of Table 1 is described above, and the same effect may be obtained if any one of four encoding methods is used as shown in Table 5.

TABLE 5

| | Output code | | | |
|---|---|---|---|---|
| Input bit | Method 1 | Method 2 | Method 3 | Method 4 |
| 0 | 00 | 00 | 11 | 11 |
| 1 | 01 | 10 | 01 | 10 |

In addition, although the line encoder uses any one of the four encoding methods as shown in Table 6 and the line decoder decodes by NXORing ON/OFF states of consecutive two images as shown in Equation 5, the same effect may be obtained. All the modulation and demodulation methods according to Tables 5 and 6 and Equations 4 and 5 have practically the same technical spirit.

TABLE 6

| Third binary data | First binary data | | | |
|---|---|---|---|---|
| | Method 1 | Method 2 | Method 3 | Method 4 |
| 0 | 01 | 01 | 10 | 10 |
| 1 | 00 | 11 | 00 | 11 |

$$bit = NXOR\{XOR(k);XOR(k+1)\} \quad \text{[Equation 5]}$$

Figure 5:
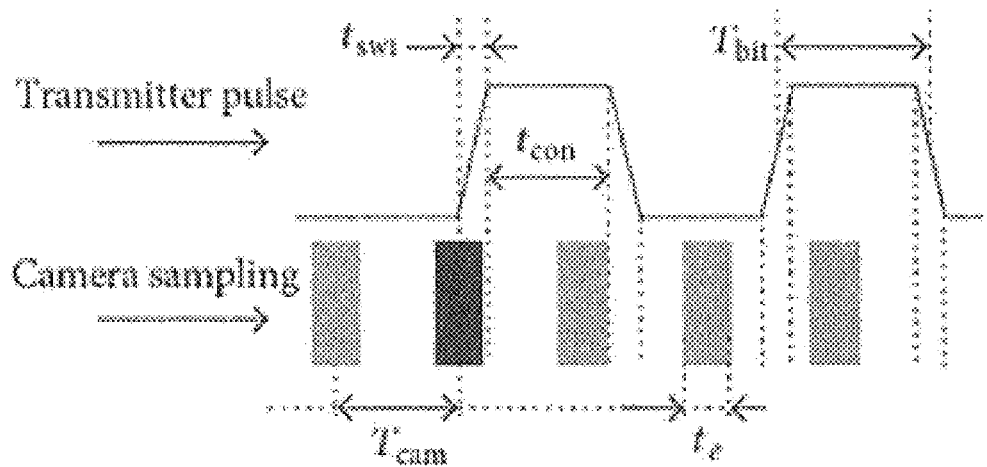
FIG. 5 is a view showing bad-sampling caused by a long exposure time.
Figure 6:
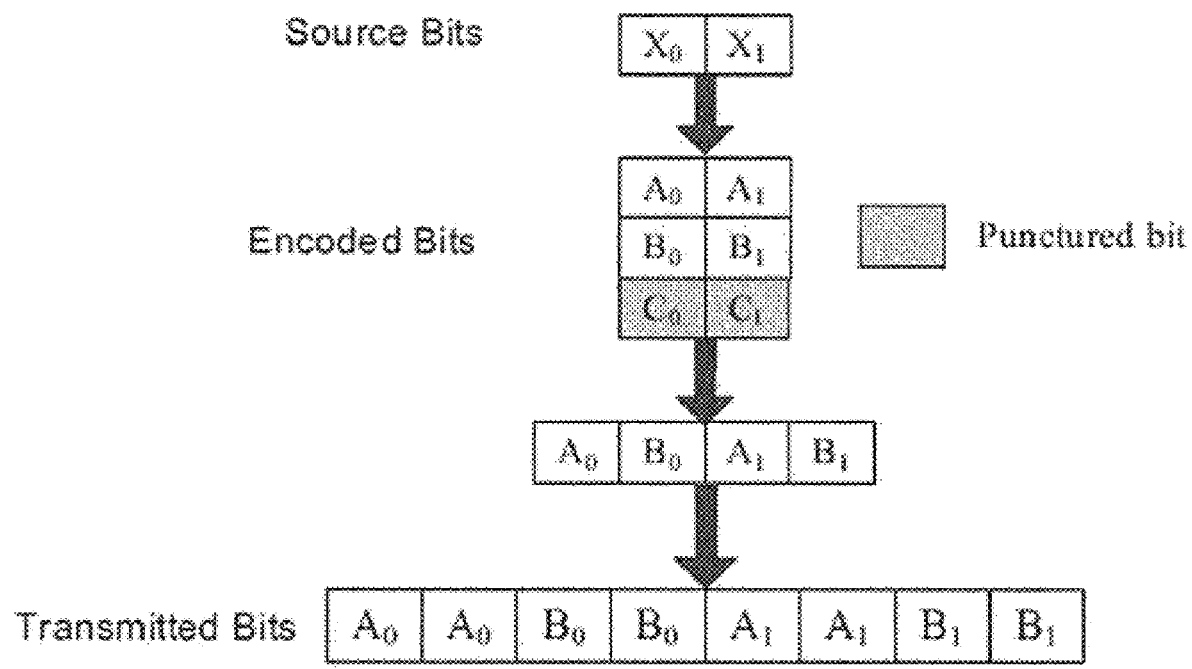
FIG. 6 is a view showing an inner FEC according to an embodiment of the present invention.

FIG. 5 is a view showing bad-sampling caused by a long exposure time.

Figure 9:
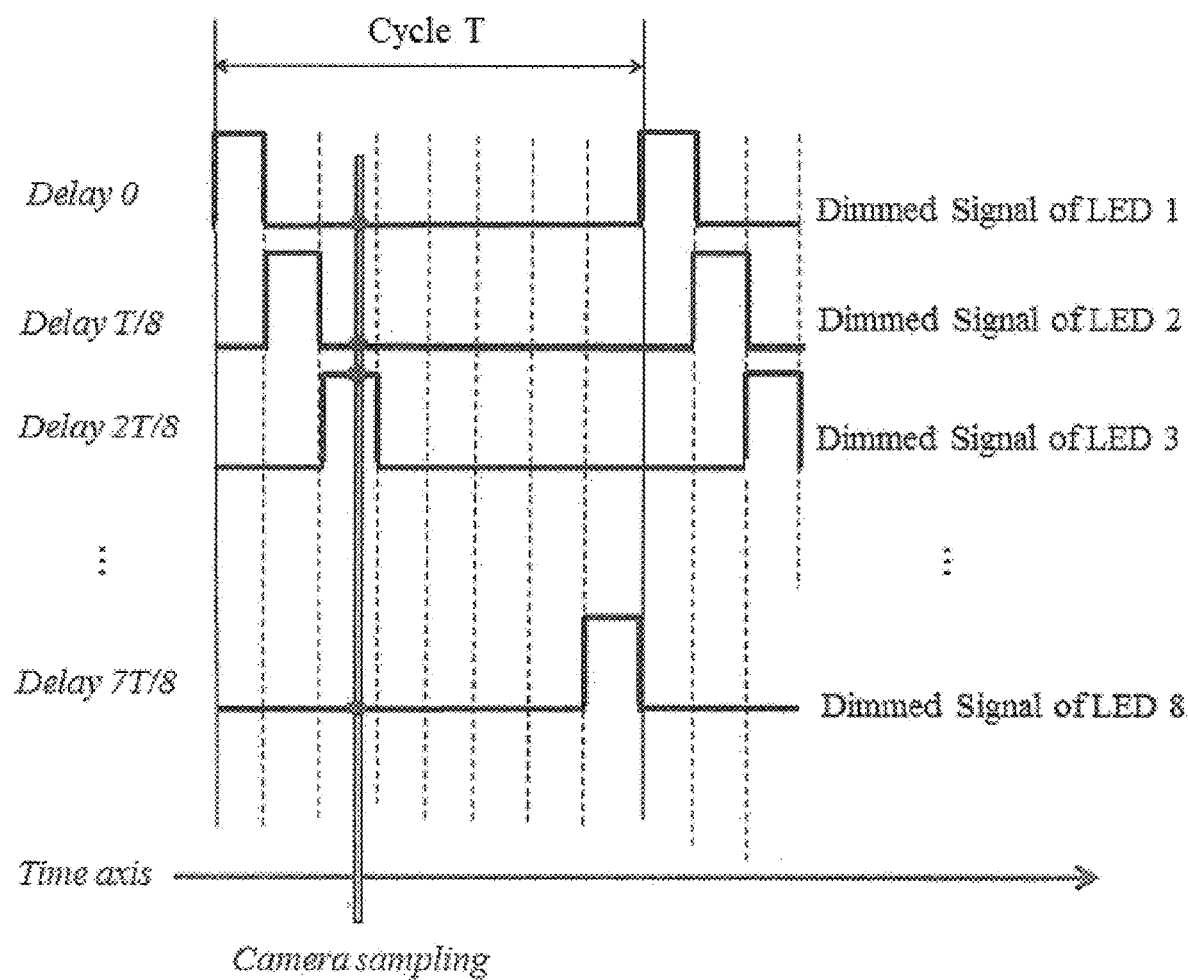
FIG. 9 is a view illustrating the principle of a DSM-PSK optical wireless communication method according to an embodiment of the present invention.

Particularly, an additional error may be occurred by rotation of a light source or an image sensor. This occurs when a light source is sampled at a N-th bit interval and the other light source is sampled at a N+1-th bit interval. To correct such an error, an inner FEC of code rate 1/4 is used according to the IEEE 802.15.7 VLC standard. That is, as shown in FIG. 9, a 1/2 code is obtained by puncturing a 1/3 mother code, and a 1/4 code is obtained by using a simple repetition code.

Since the S2-PSK optical wireless communication system according to the present invention described above is compatible with both a global shutter and a rolling shutter, compatible with a greatly alternating frame rate, applicable to fast movement of a light source or an image sensor, and normally operable although a light source or an image sensor rotates at any angle, it is particularly useful for communications between vehicles.

DSM-PSK

Figure 7:
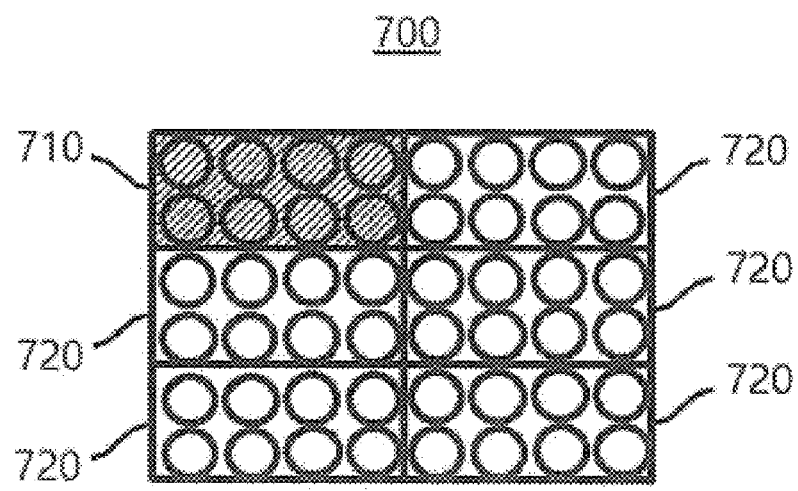
FIG. 7 is a view showing a light source panel of a DSM-PSK optical wireless transmitting device according to an embodiment of the present invention.

DSM-PSK is a Spatial M-Phase Shift Keying method which supports dimming. Here, M is an integer equal to or greater than 3, and it will be described focusing on a case of M=8 for convenience's sake. FIG. 7 is a view showing a light source panel of a DSM-PSK optical wireless transmitting device according to an embodiment of the present invention. Referring to 7, a light source panel 700 of a DSM-PSK optical wireless transmitting device according to an embodiment of the present invention includes a reference light source group representing a reference phase and one or more data light source groups 720, the phase of which is modulated by data. Each of the light source groups includes M light sources.

Figure 8:
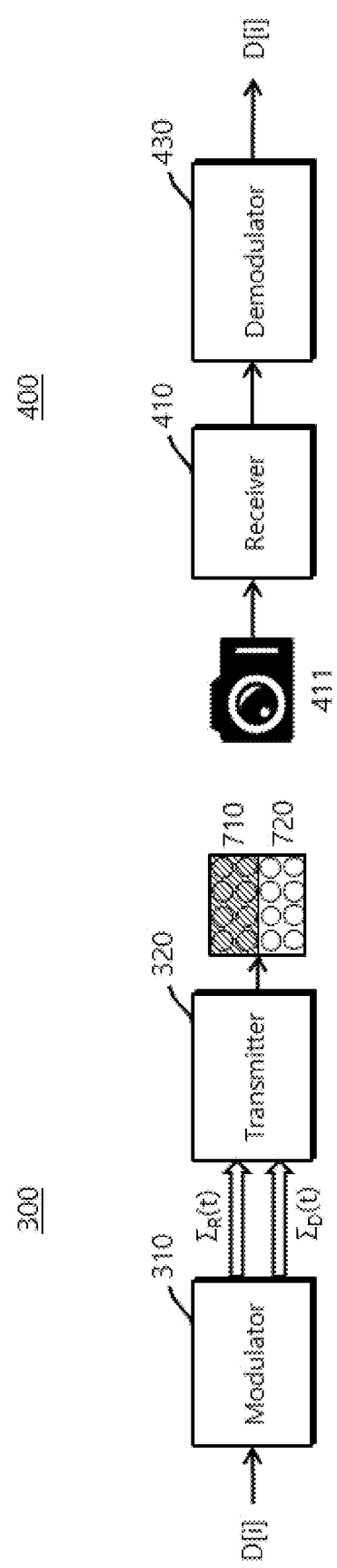
FIG. 8 is a view schematically showing the configuration of a DSM-PSK optical wireless communication system according to an embodiment of the present invention.

FIG. 8 is a view schematically showing the configuration of a DSM-PSK optical wireless communication system according to an embodiment of the present invention. Referring to FIG. 8, a DSM-PSK optical wireless communication system according to an embodiment of the present invention includes a DSM-PSK optical wireless transmitting device 300 and a DSM-PSK optical wireless receiving device 400. The DSM-PSK optical wireless transmitting device 300 includes a modulator 310 and a transmitter 320, and the DSM-PSK optical wireless receiving device 400 includes a receiver 410 and a demodulator 430 and may additionally include a light source detector (not shown). The modulator 310 receives an input of a binary data signal D[i] to be transmitted and creates a reference signal group $\Sigma_R(t)$ including M ordered pulse wave signals and a data signal group $\Sigma_D(t)$ including M ordered pulse wave signals. FIG. 8 shows a case of one data light source group 720, and in the case of a plurality of data light source groups, there will be a plurality of data signal groups. The transmitter 320 transmits data by turning on and off the reference light source group 710 and the data light source group 720 according to the signal groups $\Sigma_R(t)$ and $\Sigma_D(t)$. The receiver 410 receives a row of images of light sources consecutively photographed by an image sensor 411. The image sensor 411 is an image sensor of a global shutter method. The demodulator 430 demodulates a data signal on the basis of ON/OFF states of the light sources. Hereinafter, it will be described focusing on a case of one data light source group for the convenience of explanation.

FIG. 9 is a view illustrating the principle of a DSM-PSK optical wireless communication method according to an embodiment of the present invention. As shown in FIG. 9, a DSM-PSK optical wireless communication method according to an embodiment of the present invention turns on and off M light sources in a light source group using M pulse waves of the same cycle and different phases. The order of the M different pulse waves is predetermined, and the order of the M light sources is also predetermined.

All the M pulse waves have the same duty ratio of d/M. Here, d is an integer from 1 to M−1. In the example shown in FIGS. 9, M=8 and d=1, and eight pulse waves having a duty ratio of 1/8 are used. Duty ratios that the pulse waves may have when M=8 are 1/8 to 7/8. Since average brightness of a light source varies according to the duty ratio of a pulse wave driving the light source, brightness of a light source panel may be adjusted by varying value d. Accordingly, d may be referred to as a dimming level of a light source. That is, the DSM-PSK method according to the present invention supports dimming which adjusts brightness of the light source panel 700 in units of 1/M. When M=8, the dimming may be adjusted in units of 12.5%.

Since the cycle of the pulse waves is T and the pulse waves are delayed in units of T/M, the phases of pulse waves will vary in units of $2\pi/M$. That is, each of the M pulse waves has a phase of $p*2\pi/M$. Here, p is an integer from 0 to M−1.

Since M ordered light sources are turned on and off by ordered pulse waves having the same cycle, the same duty ratio of d/M and phases different from each other in units of $2\pi/M$, the current time point of a pulse wave in a cycle T on the time axis may be known in units of T/M from one image of M light sources photographed at a moment. Observing the example shown in FIG. 9, if ON/OFF states of the light sources of a photographed image are expressed as a binary digit, it is 00100000, and thus it is understood that the image is photographed in the third section among the time sections obtained by dividing a cycle T in units of T/M. An integer value from 1 to M expressing a time point in a cycle determined by ON/OFF states of the M light sources photographed by the image sensor is referred to as a 'spatial phase' and expressed as S_Phase.

For example, when M=8, the spatial phase according to the ON/OFF states of the light sources may be defined as shown in Table 7.

TABLE 7

| d = 1 (1/8 Dimming) | | d = 2 (2/8 Dimming) | | d = 3 (3/8 Dimming) | | d = 4 (4/8 Dimming) | |
| --- | --- | --- | --- | --- | --- | --- | --- |
| 8-States Input | S_Phase Output | 8-States Input | S_Phase Output | 8-States Input | S_Phase Output | 8-States Input | S_Phase Output |
| 1000 0000 | 1 | 1000 0001 | 1 | 1000 0011 | 1 | 1000 0111 | 1 |
| 0100 0000 | 2 | 1100 0000 | 2 | 1100 0001 | 2 | 1100 0011 | 2 |
| 0010 0000 | 3 | 0110 0000 | 3 | 1110 0000 | 3 | 1110 0001 | 3 |
| 0001 0000 | 4 | 0011 0000 | 4 | 0111 0000 | 4 | 1111 0000 | 4 |
| 0000 1000 | 5 | 0001 1000 | 5 | 0011 1000 | 5 | 0111 1000 | 5 |
| 0000 0100 | 6 | 0000 1100 | 6 | 0001 1100 | 6 | 0011 1100 | 6 |
| 0000 0010 | 7 | 0000 0110 | 7 | 0000 1110 | 7 | 0001 1110 | 7 |
| 0000 0001 | 8 | 0000 0011 | 8 | 0000 0111 | 8 | 0000 1111 | 8 |

| d = 5 (5/8 Dimming) | | d = 6 (6/8 Dimming) | | d = 7 (7/8 Dimming) | |
| --- | --- | --- | --- | --- | --- |
| 8-States Input | S_Phase Output | 8-States Input | S_Phase Output | 8-States Input | S_Phase Output |
| 1000 1111 | 1 | 1001 1111 | 1 | 1011 1111 | 1 |
| 1100 0111 | 2 | 1100 1111 | 2 | 1101 1111 | 2 |
| 1110 0011 | 3 | 1110 0111 | 3 | 1110 1111 | 3 |
| 1111 0001 | 4 | 1111 0011 | 4 | 1111 0111 | 4 |
| 1111 1000 | 5 | 1111 1001 | 5 | 1111 1011 | 5 |
| 0111 1100 | 6 | 1111 1100 | 6 | 1111 1101 | 6 |
| 0011 1110 | 7 | 0111 1110 | 7 | 1111 1110 | 7 |
| 0001 1111 | 8 | 0011 1111 | 8 | 0111 1111 | 8 |

Observing Table 7, it is understood that if ON/OFF states of M light sources are expressed as a binary digit, it is a value corresponding to a cycle of a binary data having a cycle of M and a duty ratio of d/M. Although it is defined in Table 7 that the phase of a binary digit itself is a spatial phase, it may be defined in a different order.

The modulator 310 receives an input of a binary data signal and converts the binary data signal into a global phase shift signal having an integer value from 0 to M−1. The global phase shift signal is a signal for phase modulation of a data signal group, and phases of all pulse waves in the data signal group are equally shifted according to the value of the global phase shift signal.

The modulator 310 may convert the inputted binary data signal into a global phase shift signal having an integer value from 0 to (M−1)=(2^k−1) by dividing the binary data signal in groups of k bits. For example, when M=8 and k=3, the modulator 310 may convert the binary data signal into a global phase shift signal according to Table 8.

TABLE 8

| 3-bits Input | Global Phase Shift Output |
|---|---|
| 000 | 0 |
| 001 | 1 |
| 010 | 2 |
| 011 | 3 |
| 100 | 4 |
| 101 | 5 |
| 110 | 6 |
| 111 | 7 |

The modulator 310 creates a reference signal group including M ordered pulse wave signals having the same duty ratio of d/M and different phases. The modulator 310 creates a data signal group including M ordered pulse wave signals by phase-shifting the reference signal group according to the global phase shift signal. At this point, the phase of the data signal group leads the phase of the reference signal group according to the value of the global phase shift signal. For example, if the value of the global phase shift signal is 5, the phase of each pulse wave signal in the data signal group leads the phase of each pulse wave signal in the reference signal group as much as 5*2π/M.

The transmitter 320 turns on and off the light sources of the reference light source group 710 according to each pulse wave signal of the reference signal group and turns on and off the light sources of the data light source group 720 according to each pulse wave signal of the data signal group.

The receiver 410 receives consecutively photographed images from the image sensor 411. The demodulator 430 detects ON/OFF states of the reference light source group and the data light source group on the received images and converts the ON/OFF state of each light source group into a spatial phase. That is, the demodulator 430 converts the ON/OFF state of the reference light source group into a reference spatial phase according to a predetermined rule and converts the ON/OFF state of the data light source group into a data spatial phase according to the same rule.

The conversion rule may be based on, for example, Table 7. The demodulator 430 may select one of sub-tables of each dimming level shown in Table 7 according to the dimming level of a light source panel and convert the ON/OFF state of a light source group into a spatial phase using the selected sub-table.

The demodulator 430 obtains a spatial phase shift from the difference between the data spatial phase and the reference spatial phase. The spatial phase shift has an integer value from 0 to M−1 and is expressed as S_Phase_Shift. For example, if the data spatial phase is 7 and the reference spatial phase is 2, the spatial phase shift becomes 5. The spatial phase shift obtained by the ON/OFF states of the data light source group and the reference light source group becomes equal to the phase difference between the data light source group and the reference light source group, i.e., the global phase shift. The demodulator 430 may obtain the data signal transmitted from the transmitting side by converting the spatial phase shift into a binary data. When the spatial phase shift has a value from 0 to (M−1)=(2^k−1), the demodulator 430 may convert the spatial phase shift into a binary data of k bits. For example, when M=8 and k=3, the demodulator 430 may convert the spatial phase shift into a binary data according to Table 9.

TABLE 9

| S_Phase_Shift Input | 3-bits Input |
|---|---|
| 0 | 000 |
| 1 | 001 |
| 2 | 010 |
| 3 | 011 |
| 4 | 100 |
| 5 | 101 |
| 6 | 110 |
| 7 | 111 |

In an embodiment, the demodulator 430 may convert the ON/OFF state of each light source group into a spatial phase according to the rules redefined as shown in Table 10, instead of the rules defined as shown in Table 7, in order to correct a sampling error caused by a long exposure time. In table 10, x shows an unclear ON/OFF state of a light source on an image that is wrongly sampled by the long exposure time. Reduction of data rate caused by the redefinition does not occur. It is apparent that the rules may also be redefined in such a manner when M is other than 8. Additionally, an outer FEC code may be used according to the IEEE 802.15.7 VLC standard, or simply a repetition code may be used.

TABLE 10

| d = 1 (1/8 Dimming) | | d = 2 (2/8 Dimming) | | d = 3 (3/8 Dimming) | | d = 4 (4/8 Dimming) | |
|---|---|---|---|---|---|---|---|
| 8-States Input | S_Phase Output | 8-States Input | S_Phase Output | 8-States Input | S_Phase Output | 8-States Input | S_Phase Output |
| xx00 0000 | 1 | 1x00 000x | 1 | 1x00 00x1 | 1 | 1x00 0x11 | 1 |
| 0xx0 0000 | 2 | x1x0 0000 | 2 | 11x0 000x | 2 | 11x0 00x1 | 2 |
| 00xx 0000 | 3 | 0x1x 0000 | 3 | x11x 0000 | 3 | 111x 000x | 3 |
| 000x x000 | 4 | 00x1 x000 | 4 | 0x11 x000 | 4 | x111 x000 | 4 |
| 0000 xx00 | 5 | 000x 1x00 | 5 | 00x1 1x00 | 5 | 0x11 1x00 | 5 |
| 0000 0xx0 | 6 | 0000 x1x0 | 6 | 000x 11x0 | 6 | 00x1 11x0 | 6 |
| 0000 00xx | 7 | 0000 0x1x | 7 | 0000 x11x | 7 | 000x 111x | 7 |
| x000 000x | 8 | x000 00x1 | 8 | x000 0x11 | 8 | x000 x111 | 8 |

| d = 5 (5/8 Dimming) | | d = 6 (6/8 Dimming) | | d = 7 (7/8 Dimming) | |
|---|---|---|---|---|---|
| 8-States Input | S_Phase Output | 8-States Input | S_Phase Output | 8-States Input | S_Phase Output |
| 1x00 x111 | 1 | 1x0x 1111 | 1 | 1xx1 1111 | 1 |
| 11x0 0x11 | 2 | 11x0 x111 | 2 | 11xx 1111 | 2 |

TABLE 10-continued

| | | | | | | |
|---|---|---|---|---|---|---|
| 111x 00x1 | 3 | 111x 0x11 | 3 | 111x x111 | 3 |
| 1111 x00x | 4 | 1111 x0x1 | 4 | 1111 xx11 | 4 |
| x111 1x00 | 5 | 1111 1x0x | 5 | 1111 1xx1 | 5 |
| 0x11 11x0 | 6 | x111 11x0 | 6 | 1111 11xx | 6 |
| 00x1 111x | 7 | 0x11 111x | 7 | x111 111x | 7 |
| x00x 1111 | 8 | x0x1 1111 | 8 | xx11 1111 | 8 |

Hybrid DSM-PSK

A hybrid DSM-PSK method is a method of simultaneously transmitting two different data in two different modulation methods by modulating brightness of one or more light source panels turning on and off by the DSM-PSK method using another modulation method. Hereinafter, it will be described focusing on an embodiment, in which two light source panels are provided and brightness of the two light source panels is modulated using a S2-PSK method, i.e., a hybrid 52-PSK/DSM-PSK method, for the convenience of explanation. It is apparent that the hybrid DSM-PSK method may use all kinds of modulation methods which use change of brightness of one or more light sources, as well as the S2-PSK method.

Figure 10:
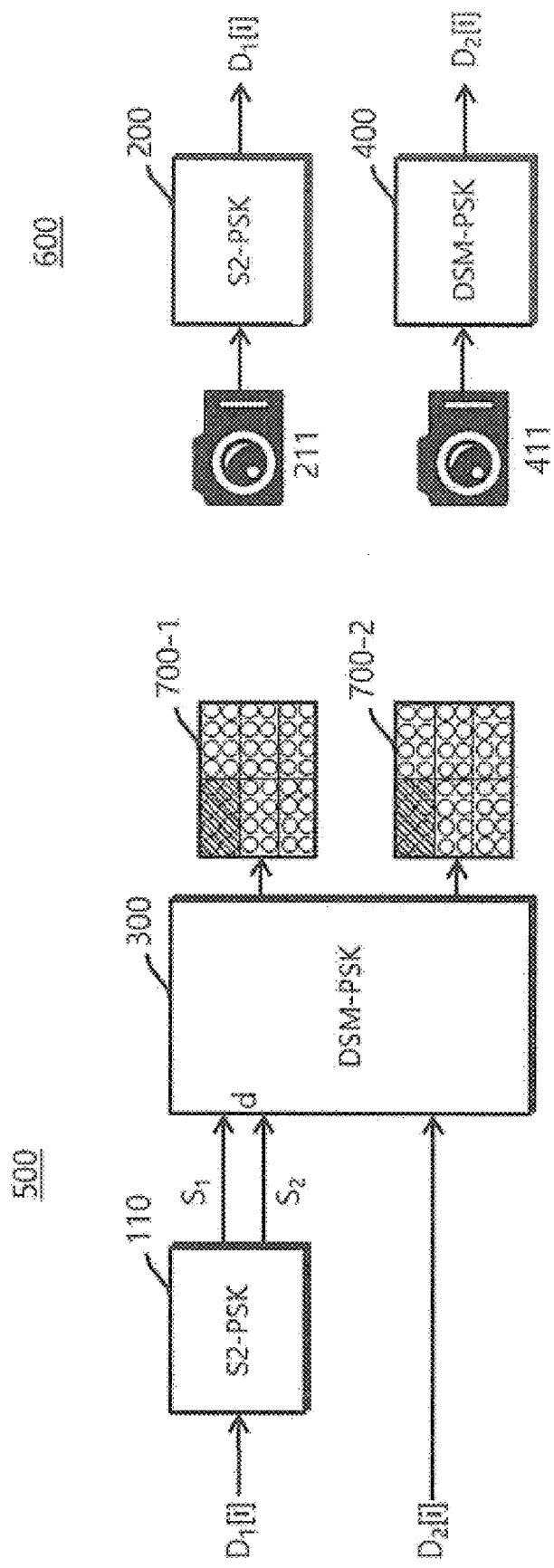
FIG. 10 is a view schematically showing the configuration of a hybrid DSM-PSK optical wireless communication system according to an embodiment of the present invention.

FIG. 10 is a view schematically showing the configuration of a hybrid DSM-PSK optical wireless communication system according to an embodiment of the present invention. Referring to FIG. 10, a hybrid optical wireless communication system according to an embodiment of the present invention includes a hybrid DSM-PSK optical wireless transmitting device 500 and a hybrid DSM-PSK optical wireless receiving device 600. The hybrid DSM-PSK optical wireless transmitting device 500 includes an S2-PSK modulator 110 and a DSM-PSK optical wireless transmitting device 300, and the hybrid DSM-PSK optical wireless receiving device 600 includes an S2-PSK optical wireless receiving device 200 and a DSM-PSK optical wireless receiving device 400. The structure and operation of each constitutional component are the same as described in relation to FIGS. 1 and 8.

The S2-PSK modulator 110 receives an input of a first data signal and generates binary data signals $S_1$ and $S_2$ of a first frequency using the S2-PSK method described above. The DSM-PSK optical wireless transmitting device 300 changes brightness of light source panel 700-1 and light source panel 700-2 according to the DSM-PSK method described above using values of $S_1$ and $S_2$ as dimming level d. Here, since $S_1$ and $S_2$ have a dimming level of a light source panel as a value of their own, they are referred to as a dimming signal.

At this point, the DSM-PSK optical wireless transmitting device 300 receives an input of a second data signal and changes brightness of the light source panels 700-1 and 700-2 using the second data signal as an input signal. The DSM-PSK optical wireless transmitting device 300 may generate two data signals by demultiplexing or splitting the second data signal and use the data signals to change brightness of the light source panel 700-1 and the light source panel 700-2. Preferably, the DSM-PSK optical wireless transmitting device 300 may use a DS8-PSK method.

The frequency of the pulse wave signals used by the DSM-PSK optical wireless transmitting device 300 to turn on and off the light sources in a light source panel is a second frequency, and preferably, the second frequency is higher than the first frequency. That is, each light source in a light source panel is turned on and off at a high speed of the second frequency, and brightness of the entire light source panel may change at a low speed of the first frequency.

Figure 11:
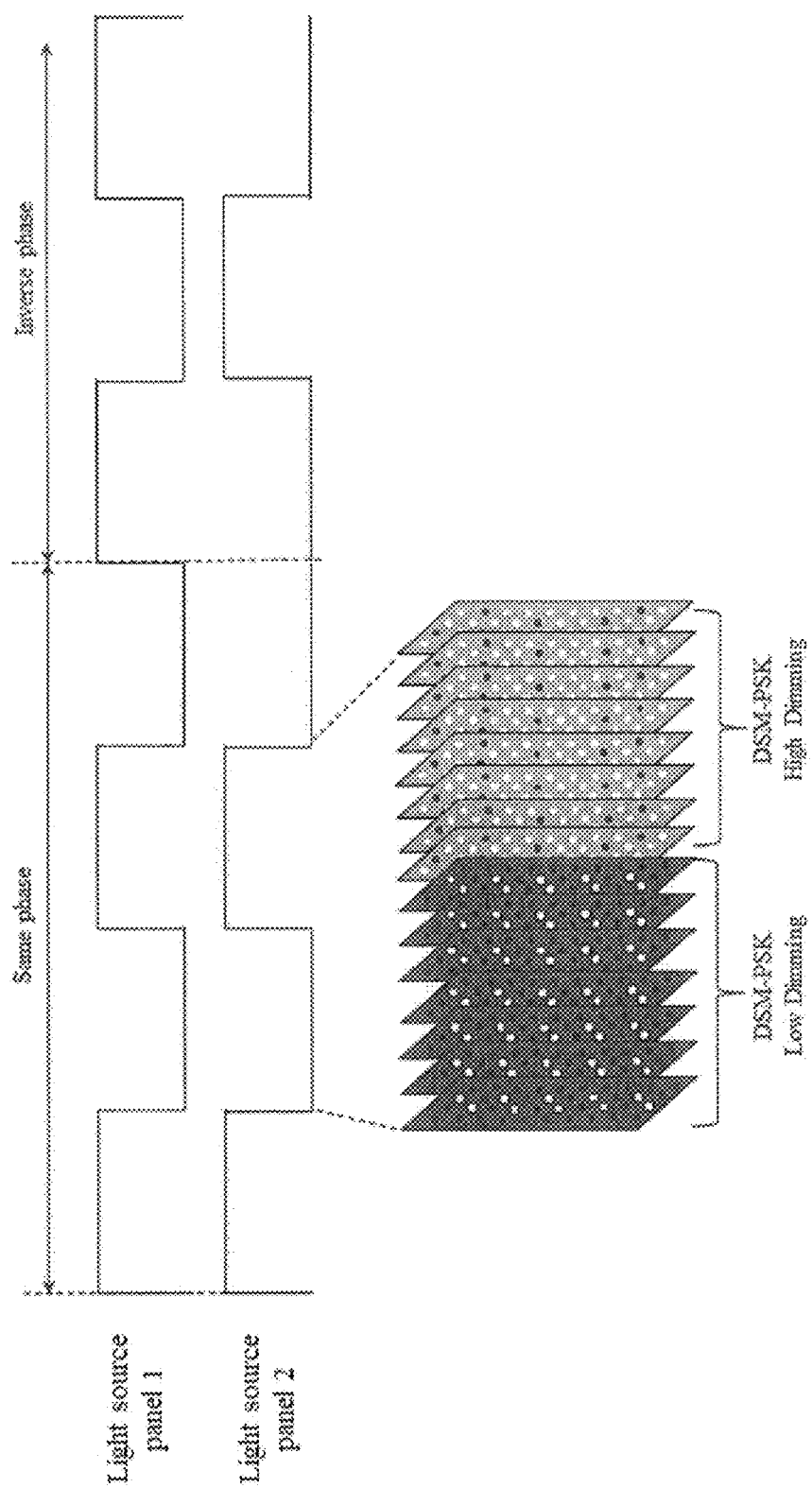
FIG. 11 is a view showing an example of the operation of a hybrid DSM-PSK optical wireless transmitting method according to an embodiment of the present invention.

In summary, the hybrid DSM-PSK optical wireless transmitting device 500 transmits a first data signal in the S2-PSK method using two light source panels and transmits a second data signal in the DSM-PSK method using the light sources in the two light source panels. FIG. 11 is a view showing an example of the operation of the hybrid DSM-PSK optical wireless transmitting method.

The DSM-PSK optical wireless transmitting device 300 may set the dimming level d to d0 if the value of the dimming signal ($S_1$ or $S_2$) is 0 and set the dimming level d to d1 if the value of the dimming signal is 1. d1 may be a value greater than d0. In this case, since brightness of the light source panel periodically repeats d0/M and d1/M, average brightness becomes (d0+d1)/2M. To avoid confusion, the average brightness of a light source panel will be referred to as 'illuminance'. The DSM-PSK optical wireless transmitting device 300 may receive an input of illuminance of a light source panel and adjust d0 and d1 so that (d0+d1)/2M becomes equal to the inputted illuminance. The illuminance of a light source panel may be adjusted from 1.5 to M−1.5 in units of 0.5.

Meanwhile, the S2-PSK optical wireless receiving device 200 and the DSM-PSK optical wireless receiving device 400 of the hybrid DSM-PSK optical wireless receiving device 600 demodulate the first data signal and the second data signal, respectively. At this point, the S2-PSK optical wireless receiving device 200 may receive images of the light source panels 700-1 and 700-2 photographed at a first frame rate from the image sensor 211 and demodulate the data, and the DSM-PSK optical wireless receiving device 400 may receive images of the light source panels 700-1 and 700-2 photographed at a second frame rate from the image sensor 411 and demodulate the data. The first frame rate should be higher than the clock frequency of the first data signal, and the second frame rate should be higher than the clock frequency of the second data signal. Preferably, the second frame rate is higher than the first frame rate. That is, the image sensor 211 may be a low speed image sensor, and the image sensor 411 may be a high speed image sensor. The image sensor 211 may be an image sensor of a global shutter method or a rolling shutter method, and the image sensor 411 may be an image sensor of a global shutter method.

The S2-PSK optical wireless receiving device 200 may detect change of brightness of the light source panels 700-1 and 700-2 on the image photographed by the first image sensor at the first frame rate and demodulate the first binary data using the S2-PSK method according to the change of brightness of the light source panels 700-1 and 700-2.

At this point, when the shutter speed of the first image sensor is sufficiently slower than the second frequency, which is the frequency of the DSM-PSK signal (when the exposure time of the first image sensor is sufficiently longer than the cycle of the DSM-PSK signal), all the light sources in a light source panel will be seen in equally dimmed brightness (d0/M or d1/M), i.e., brightness corresponding to the magnitude of the S2-PSK signal, in a photographed image. Otherwise, each of the light sources in the light source panel is independently turned on and off to be seen in different brightness, and the S2-PSK optical wireless receiving device 200 may calculate an average of the brightness of the light sources in the light source panel and determine the average as the brightness of the light source panel. If the shutter speed of the first image sensor is fast, performance of removing noises and detecting light sources is improved.

Figure 12:
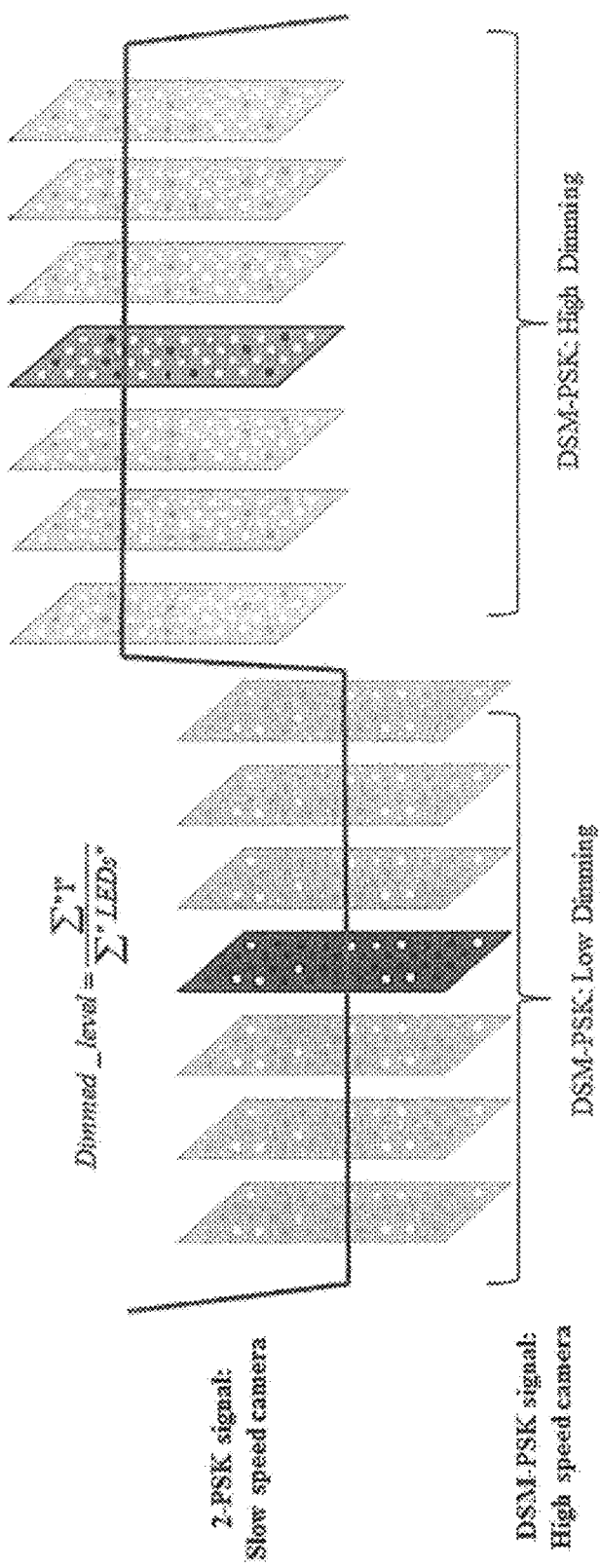
FIG. 12 is a view showing an example of the operation of a hybrid DSM-PSK optical wireless receiving method according to an embodiment of the present invention.

The DSM-PSK optical wireless receiving device 400 may demodulate the second binary data in the DSM-FSK method according to the ON/OFF states of the light sources in each light source panel 700-1 or 700-2 on an image photographed by the first image sensor at the second frame rate. FIG. 12 is a view showing an example of the operation of the hybrid DSM-PSK optical wireless receiving method.

The DSM-PSK optical wireless receiving device 400 and the second image sensor 411 may determine a Region of Interest (RoI) and photograph and demodulate the RoI at a high frame rate, using the position of the light source panel detected by the S2-PSK optical wireless receiving device 200. That is, if the hybrid S2-PSK and DSM-PSK method according to the present invention is used, data may be received at a high speed by sampling an RoI at a high speed using an expensive RoI high-speed image sensor 411 of a global shutter method, after the RoI is determined in real-time by scanning a photographing range in a speedy way using an inexpensive and low-speed image sensor 211 of a rolling shutter method or a global shutter method.

Figure 13:
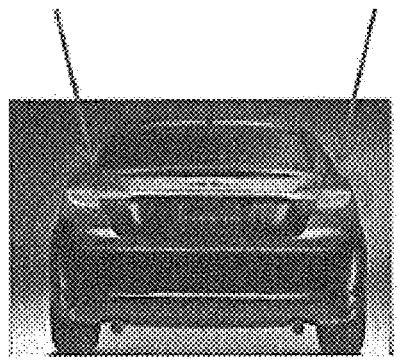
FIGS. 13 and 14 are views showing use cases to which an optical wireless communication system according to an embodiment of the present invention may be applied.
Figure 14:
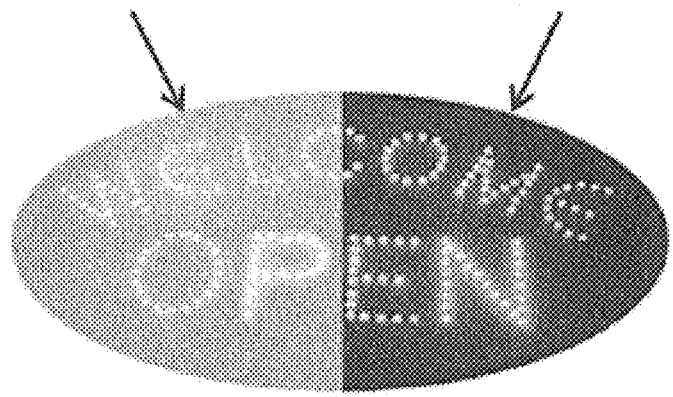

FIGS. 13 and 14 are views showing use cases to which an optical wireless communication system according to an embodiment of the present invention may be applied. As shown in FIG. 13, data may be transmitted in the hybrid DSM-PSK method according to the present invention using left and right LED taillights of a vehicle as light sources. Short identification information or a short message may be exchanged between vehicles in the S2-PSK method, and data may be transmitted at a high speed in the DSM-FSK method. As shown in FIG. 14, data may be transmitted in the hybrid DSM-PSK method according to the present invention by dividing a signboard into left and right sides or upper and lower sides and using the signboard as two light sources. If ON/OFF speed of each light source by the DSM-PSK method and the speed of changing brightness of each light source panel by the S2-PSK method are sufficiently fast, a human being does not feel ON/OFF of a vehicle taillight or a signboard.

The present invention may be implemented as a computer-readable code in a computer-readable medium. The computer-readable medium includes all storage media including a magnetic storage medium, an optically readable medium, a carrier wave (e.g., transmission through Internet) and the like.

The present invention has been described in detail focusing on the preferred embodiments shown in the drawings. These embodiments are not to restrict the present invention but only illustrative, and should be considered from the descriptive viewpoint, not restrictive viewpoint. The real technical protection scope should be defined by the technical spirit of the appended claims, not by the descriptions stated above. Although specific terms are used in the specification, they are used only for the purpose of describing the concept of the present invention, not to restrict the meaning or limit the scope of the present invention stated in the claims. Each step of the present invention does not need to be necessarily performed in the stated order and may be performed in parallel, selectively or individually. Those skilled in the art may understand that various modified forms and equivalent other embodiments are possible without departing from the fundamental spirit of the present invention. It should be understood that the equivalents include equivalents that will be developed in the future, as well as presently known equivalents, i.e., all constitutional components invented to perform the same function regardless of a structure.

The invention claimed is:

1. A hybrid DSM-PSK optical wireless transmitting method comprising:
    generating, by a first modulator, a first dimming signal of a first frequency periodically repeating binary value 0s and 1s;
    receiving, by the first modulator, an input of a first binary data signal;
    outputting, by the first modulator, a second dimming signal, which is a binary data signal, having a frequency the same as that of the first dimming signal, a phase the same as that of the first dimming signal when the first binary data signal is a binary value 0, and a phase opposite to that of the first dimming signal when the first binary data signal is a binary value 1;
    changing, by a DSM-PSK optical wireless transmitting device, brightness of a first light source panel according to the first dimming signal; and
    changing, by the DSM-PSK optical wireless transmitting device, brightness of a second light source panel according to the second dimming signal, wherein
    each of changing brightness of a first light source panel and changing brightness of a second light source panel includes:
    receiving, by a second modulator, an input of the first or second dimming signal;
    generating, by the second modulator, a signal d having a value d0 when the inputted dimming signal is a binary value 0 and having a value d1 when the inputted dimming signal is a binary value 1, wherein d0 and d1 are different integers from 1 to M−1, and M is an integer equal to or greater than 3;
    receiving, by the second modulator, an input of a second binary data signal;
    converting, by the second modulator, the second binary data signal into a global phase shift signal having an integer value from 0 to M−1;
    creating, by the second modulator, a reference signal group including M ordered pulse wave signals having the same frequency of the second frequency, the same duty ratio of d/M and different phases, wherein the phase is p*2π/M, and p is an integer from 0 to M−1;
    creating, by the second modulator, a data signal group including M ordered pulse wave signals by phase-shifting the reference signal group according to the global phase shift signal;
    turning on and off, by a transmitter, each of light sources of the reference light source group including M ordered light sources in a light source panel corresponding to the inputted dimming signal, according to each pulse wave signal of the reference signal group; and
    turning on and off, by the transmitter, each of light sources of the data light source group including M ordered light sources in a light source panel corresponding to the inputted dimming signal, according to each pulse wave signal of the data signal group.

2. The method according to claim 1, wherein the second frequency is higher than the first frequency.

3. The method according to claim 1, further comprising receiving, by the DSM-PSK optical wireless transmitting device, an input of illuminance of a light source panel, and determining d0 and d1 so that (d0+d1)/2M becomes the inputted illuminance of a light source panel.

4. The method according to claim 1, wherein converting the second binary data signal into a global phase shift signal includes converting the second binary data signal into the global phase shift signal having an integer value from 0 to (M−1)=(2^k−1) by dividing the second binary data signal in groups of k bits.

5. The method according to claim 4, wherein k is 3, and converting the second binary data signal is based on a table shown below

| 3-bits Input | Global Phase Shift Output |
|---|---|
| 000 | 0 |
| 001 | 1 |
| 010 | 2 |
| 011 | 3 |
| 100 | 4 |
| 101 | 5 |
| 110 | 6 |
| 111 | 7. |

6. A hybrid DSM-PSK optical wireless receiving method comprising:
receiving, by a first receiver, first images consecutively photographed at a first frame rate from a first image sensor;
outputting, by a first demodulator, a first binary data having a binary value 0 when a phase of change of brightness of a first light source panel on the first images is the same as a phase of change of brightness of a second light source panel on the first images and having a binary value 1 when the phase of change of brightness of the first light source panel is opposite to the phase of change of brightness of the second light source panel;
receiving, by a second receiver, second images consecutively photographed at a second frame rate from a second image sensor; and
demodulating, by a second demodulator, a second binary data using a DSM-PSK optical wireless receiving method for light sources of the first light source panel or the second light source panel on the second images, wherein demodulating a second binary data includes:
detecting ON/OFF states of a reference light source group including M ordered light sources and a data light source group including M ordered light sources in the first light source panel or the second light source panel on the second images;
converting the ON/OFF state of the reference light source group into a reference spatial phase according to a predetermined rule, wherein the reference spatial phase is an integer from 0 to M−1;
converting the ON/OFF state of the data light source group into a data spatial phase according to the predetermined rule, wherein the data spatial phase is an integer from 0 to M−1;
obtaining a spatial phase shift from a difference between the data spatial phase and the reference spatial phase, wherein the spatial phase shift is an integer from 0 to M−1; and
converting the spatial phase shift into the second binary data.

7. The method according to claim 6, wherein the second frame rate is higher than the first frame rate.

8. The method according to claim 6, wherein the M light sources of the reference light source group are turned on and off according to a reference signal group including M ordered pulse wave signals having the same cycle, the same duty ratio of d/M and different phases, wherein d is an integer from 1 to M−1, the phase is $p \cdot 2\pi/M$, and p is an integer from 0 to M−1, and the M light sources of the data light source group are turned on and off according to a data signal group created by phase-shifting the reference signal group as much as a predetermined value.

9. The method according to claim 6, wherein the ON/OFF states of the M light sources of the reference light source group and the ON/OFF states of the M light sources of the data light source group are expressed as a binary digit of M bits, respectively, and the binary digit of M bits has a value corresponding to a cycle of a binary data having a cycle of M and a duty ratio of d/M, wherein d is an integer from 1 to M−1, and the predetermined rule determines a phase of the binary digit as a spatial phase.

10. The method according to claim 6, wherein M is 8, and the predetermined rule is based on a table shown below

| d = 1 (1/8 Dimming) | | d = 2 (2/8 Dimming) | | d = 3 (3/8 Dimming) | | d = 4 (4/8 Dimming) | |
|---|---|---|---|---|---|---|---|
| 8-States Input | S_Phase Output | 8-States Input | S_Phase Output | 8-States Input | S_Phase Output | 8-States Input | S_Phase Output |
| 1000 0000 | 1 | 1000 0001 | 1 | 1000 0011 | 1 | 1000 0111 | 1 |
| 0100 0000 | 2 | 1100 0000 | 2 | 1100 0001 | 2 | 1100 0011 | 2 |
| 0010 0000 | 3 | 0110 0000 | 3 | 1110 0000 | 3 | 1110 0001 | 3 |
| 0001 0000 | 4 | 0011 0000 | 4 | 0111 0000 | 4 | 1111 0000 | 4 |
| 0000 1000 | 5 | 0001 1000 | 5 | 0011 1000 | 5 | 0111 1000 | 5 |
| 0000 0100 | 6 | 0000 1100 | 6 | 0001 1100 | 6 | 0011 1100 | 6 |
| 0000 0010 | 7 | 0000 0110 | 7 | 0000 1110 | 7 | 0001 1110 | 7 |
| 0000 0001 | 8 | 0000 0011 | 8 | 0000 0111 | 8 | 0000 1111 | 8 |

| d = 5 (5/8 Dimming) | | d = 6 (6/8 Dimming) | | d = 7 (7/8 Dimming) | |
|---|---|---|---|---|---|
| 8-States Input | S_Phase Output | 8-States Input | S_Phase Output | 8-States Input | S_Phase Output |
| 1000 1111 | 1 | 1001 1111 | 1 | 1011 1111 | 1 |
| 1100 0111 | 2 | 1100 1111 | 2 | 1101 1111 | 2 |
| 1110 0011 | 3 | 1110 0111 | 3 | 1110 1111 | 3 |
| 1111 0001 | 4 | 1111 0011 | 4 | 1111 0111 | 4 |
| 1111 1000 | 5 | 1111 1001 | 5 | 1111 1011 | 5 |
| 0111 1100 | 6 | 1111 1100 | 6 | 1111 1101 | 6 |

-continued

| 0011 | 1110 | 7 | 0111 | 1110 | 7 | 1111 | 1110 | 7 |
| 0001 | 1111 | 8 | 0011 | 1111 | 8 | 0111 | 1111 | 8. |

11. The method according to claim 6, wherein M is 8, and the predetermined rule is based on a table shown below

| d = 1 (1/8 Dimming) | | | d = 2 (2/8 Dimming) | | | d = 3 (3/8 Dimming) | | | d = 4 (4/8 Dimming) | | |
|---|---|---|---|---|---|---|---|---|---|---|---|
| 8-States Input | | S_Phase Output | 8-States Input | | S_Phase Output | 8-States Input | | S_Phase Output | 8-States Input | | S_Phase Output |
| xx00 | 0000 | 1 | 1x00 | 000x | 1 | 1x00 | 00x1 | 1 | 1x00 | 0x11 | 1 |
| 0xx0 | 0000 | 2 | x1x0 | 0000 | 2 | 11x0 | 000x | 2 | 11x0 | 00x1 | 2 |
| 00xx | 0000 | 3 | 0x1x | 0000 | 3 | x11x | 0000 | 3 | 111x | 000x | 3 |
| 000x | x000 | 4 | 00x1 | x000 | 4 | 0x11 | x000 | 4 | x111 | x000 | 4 |
| 0000 | xx00 | 5 | 000x | 1x00 | 5 | 00x1 | 1x00 | 5 | 0x11 | 1x00 | 5 |
| 0000 | 0xx0 | 6 | 0000 | x1x0 | 6 | 000x | 11x0 | 6 | 00x1 | 11x0 | 6 |
| 0000 | 00xx | 7 | 0000 | 0x1x | 7 | 0000 | X11x | 7 | 000x | 111x | 7 |
| x000 | 000x | 8 | x000 | 00x1 | 8 | x000 | 0x11 | 8 | x000 | x111 | 8 |

| d = 5 (5/8 Dimming) | | | d = 6 (6/8 Dimming) | | | d = 7 (7/8 Dimming) | | |
|---|---|---|---|---|---|---|---|---|
| 8-States Input | | S_Phase Output | 8-States Input | | S_Phase Output | 8-States Input | | S_Phase Output |
| 1x00 | x111 | 1 | 1x0x | 1111 | 1 | 1xx1 | 1111 | 1 |
| 11x0 | 0x11 | 2 | 11x0 | x111 | 2 | 11xx | 1111 | 2 |
| 111x | 00x1 | 3 | 111x | 0x11 | 3 | 111x | x111 | 3 |
| 1111 | x00x | 4 | 1111 | x0x1 | 4 | 1111 | xx11 | 4 |
| x111 | 1x00 | 5 | 1111 | 1x0x | 5 | 1111 | 1xx1 | 5 |
| 0x11 | 11x0 | 6 | X111 | 11x0 | 6 | 1111 | 11xx | 6 |
| 00x1 | 111x | 7 | 0x11 | 111x | 7 | x111 | 111x | 7 |
| x00x | 1111 | 8 | x0x1 | 1111 | 8 | xx11 | 1111 | 8. |

12. The method according to claim 6, wherein the spatial phase shift has an integer value from 0 to $2^k-1$, and converting the spatial phase shift into a binary data includes converting the spatial phase shift into a binary data of k bits.

13. The method according to claim 12, wherein k is 3, and converting the binary data signal is based on a table shown below

| S_Phase_Shift Input | 3-bits Output |
|---|---|
| 0 | 000 |
| 1 | 001 |
| 2 | 010 |
| 3 | 011 |
| 4 | 100 |
| 5 | 101 |
| 6 | 110 |
| 7 | 111. |

14. The method according to claim 6, further comprising determining, by the first demodulator, an average of brightness of light sources in each light source panel on the first images as brightness of that light source panel.

15. The method according to claim 6, further comprising determining an RoI of the second image sensor using position information of the one or more light source panels detected on the first images.

16. The method according to claim 6, wherein the first image sensor is an image sensor of a rolling shutter method, and the second image sensor is an image sensor of a global shutter method.

17. A non-transitory computer-readable recording medium recording a program for executing the method according to claim 1.

18. A non-transitory computer-readable recording medium recording a program for executing the method according to claim 6.

* * * * *